US010800510B2

(12) United States Patent
Olson et al.

(10) Patent No.: US 10,800,510 B2
(45) Date of Patent: Oct. 13, 2020

(54) SELECTIVELY ENGAGEABLE AIRCRAFT DRIVESHAFT OFF-AXIS FROM COMPONENT STOW AXIS

(71) Applicant: Bell Helicopter Textron Inc., Fort Worth, TX (US)

(72) Inventors: Eric Stephen Olson, Fort Worth, TX (US); David Russell Bockmiller, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 384 days.

(21) Appl. No.: 15/898,550

(22) Filed: Feb. 17, 2018

(65) Prior Publication Data
US 2019/0256190 A1 Aug. 22, 2019

(51) Int. Cl.
*B64C 3/56* (2006.01)
*B64C 29/00* (2006.01)

(52) U.S. Cl.
CPC ............ *B64C 3/56* (2013.01); *B64C 29/0033* (2013.01)

(58) Field of Classification Search
CPC .. B64C 3/38; B64C 3/56; B64C 27/22; B64C 27/24; B64C 27/265; B64C 29/0033; B64C 35/04
See application file for complete search history.

(56) References Cited

U.S. PATENT DOCUMENTS

| | | | | |
|---|---|---|---|---|
| 4,691,878 A | * | 9/1987 | Vaughan | .................. B64C 3/56 244/49 |
| 2014/0263854 A1 | * | 9/2014 | Ross | .................. B64C 29/0033 244/7 A |

* cited by examiner

*Primary Examiner* — Nicholas McFall
(74) *Attorney, Agent, or Firm* — Lightfoot & Alford PLLC

(57) ABSTRACT

Systems and methods include providing an aircraft with a fuselage and a wing assembly rotatable relative to the fuselage about a stow axis between a flight position and a stowed position. The aircraft includes a gearbox having a retractable driveshaft that selectively engages the mid-wing gearbox via axially translatable motion along a rotation axis when the wing assembly is in the flight position. The retractable driveshaft also selectively disengages the mid-wing gearbox in the flight position to allow selectively rotation of the wing assembly about the stow axis from the flight position to the stowed position resulting in the mid-wing gearbox being misaligned with the retractable driveshaft when the wing assembly is in the stowed position.

14 Claims, 11 Drawing Sheets

SELECTIVELY ENGAGEABLE AIRCRAFT DRIVESHAFT OFF-AXIS FROM COMPONENT STOW AXIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Many types of aircraft often include elongated wings that extend laterally from a fuselage. These types of aircraft generally occupy a large amount of space and have a large overall footprint. As such, when these types of aircraft are not in use, storage space on aircraft carriers, in storage facilities, or runways may be limited. Further, access to hangars and/or other indoor maintenance or repair facilities may be restricted, since some types of aircraft may not fit through the doors and/or entrances of such facilities.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
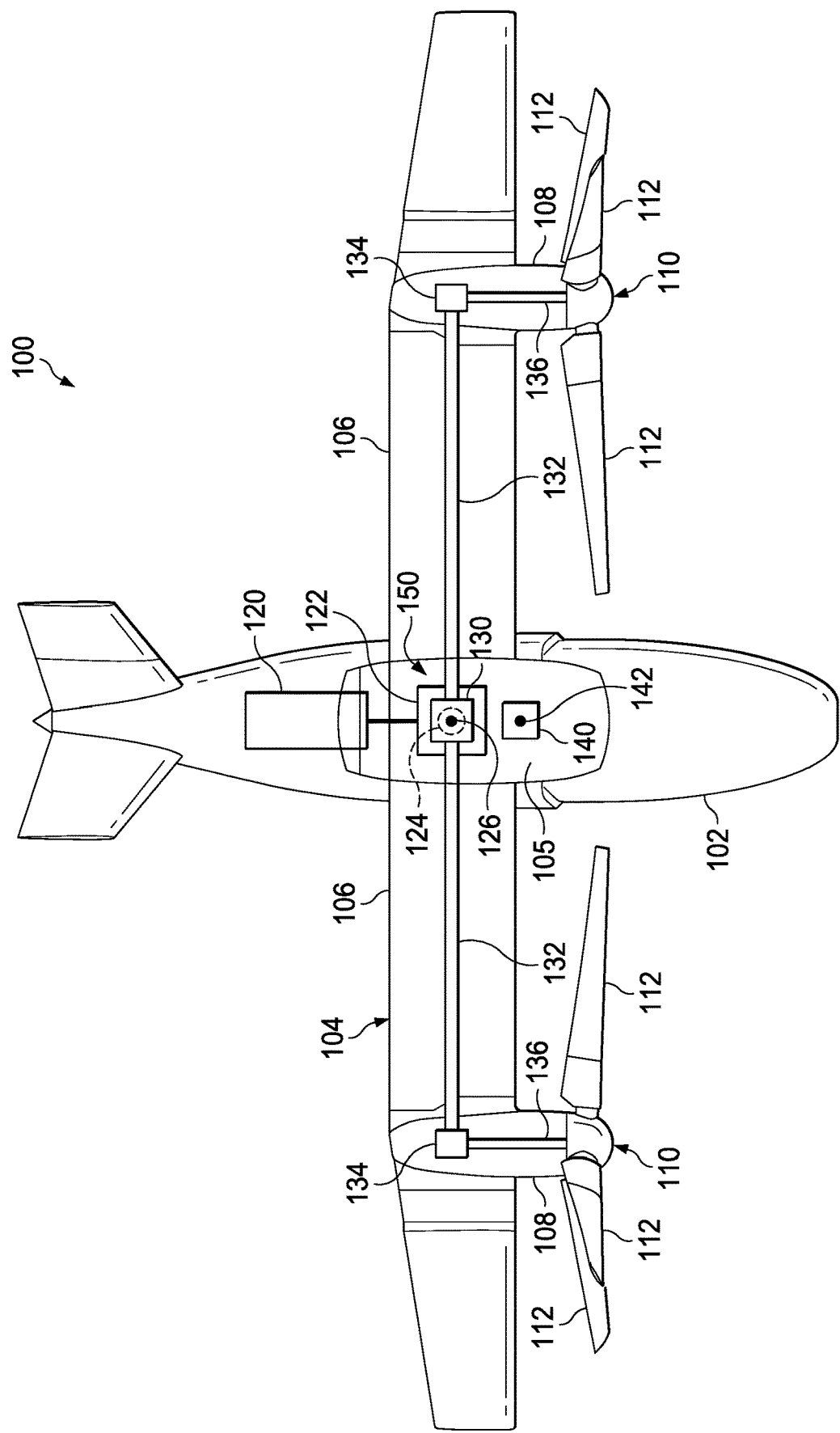
FIG. 1 is a top view of an aircraft according to this disclosure.

Referring now to FIG. 1, a top view of an aircraft 100 is shown according to this disclosure. In the embodiment shown, aircraft 100 is a tiltrotor. However, in other embodiments, aircraft 100 may be any other type of aircraft (e.g. fixed-wing aircraft, vertical takeoff and landing (VTOL) aircraft, "manned" or "unmanned" drone, etc.). Aircraft 100 generally comprises a fuselage 102 and a stowable wing assembly 104 comprising a selectively rotatable wing body 105 and a plurality of wings 106 extending therefrom. Each wing 106 comprises a pylon 108 comprising a rotor assembly 110 having a plurality of rotor blades 112 coupled thereto. Each pylon 108 is selectively pivotable between a horizontal orientation and a vertical orientation with respect to the fuselage 102 and associated wing 106 to adjust the thrust angle and transition of the aircraft 100 between an airplane mode and a helicopter mode. Accordingly, the airplane mode is associated with a more horizontally-oriented thrust angle and propelling the aircraft 100 forward in flight, while the helicopter mode is associated with a more vertically-oriented thrust angle and propelling the aircraft 100 to and from a landing area.

Aircraft 100 also comprises a drive component carried in the fuselage 102. In the embodiment shown, the drive component comprises an internal combustion engine 120 coupled to an engine reduction gearbox ("ERGB") 122 comprising a retractable driveshaft 124. However, in other embodiments, the drive component may comprise a direct-drive electric motor, a direct-drive engine, a motor and gearbox combination, or an engine and a redirection gearbox, each comprising a retractable driveshaft 124. In the embodiment shown, operation of the internal combustion engine 120 causes the retractable driveshaft 124 to rotate about its rotation axis 126. The retractable driveshaft 124 is selectively extended and retracted axially along rotation axis 126 to engage and disengage from an auxiliary or mid-wing gearbox 130 disposed within the selectively rotatable wing body 105 of the wing assembly 104. The mid-wing gearbox 130 is operatively coupled to an interconnect driveshaft 132 extending therefrom through each wing 106 to a pylon gearbox 134 disposed in each pylon 108. Each pylon gearbox 134 is coupled to the associated rotor assemblies 110 through a rotor mast 136. Thus, when the retractable driveshaft 124 is engaged with the mid-wing gearbox 130, rotation of the retractable driveshaft 124 imparted by the internal combustion engine 120 is transmitted through the mid-wing gearbox 130 to the interconnect driveshafts 132 and the rotor masts to impart rotation to the counter-rotating rotor assemblies 110. Conversely, when the retractable driveshaft 124 is disengaged from the mid-wing gearbox 130, rotation of the retractable driveshaft 124 will not impart rotation to the rotor assemblies 110. As such, the retractable driveshaft 124 allows the internal combustion engine 120 to operate to run pre-flight checks, provide electrical power, and/or provide functions of an auxiliary power unit (APU) without engaging the rotor assemblies 110.

In some embodiments, aircraft 100 may also comprise a wing assembly rotation system 140 configured to selectively rotate the wing assembly 104 with respect to the fuselage 102 about stow axis 142. Most notably, the stow axis 142 is offset from the rotation axis 126 of the retractable driveshaft 124. More specifically, the stow axis 142 is displaced longitudinally along a length of the fuselage 102 with respect to the rotation axis 126 of the retractable driveshaft 124. In some embodiments, the offset between the stow axis 142 and rotation axis 126 may be about twelve inches. The location of the rotation axis 126 is generally set by the location of the interconnect driveshafts 132 and/or the mid-wing gearbox 130. The stow axis 142 is generally selected to center the wing assembly 104 over the fuselage 102, thereby reducing the overall footprint of the aircraft 100 when the wing assembly 104 is fully rotated. Further, in some embodiments, offsetting the stow axis 142 towards a more forward portion of the wing assembly 104 may provide structural benefits, such as allowing rotation of the wing assembly 104 in a thicker, more structurally rigid portion of the wing assembly 104. Additionally, as will be discussed further herein, it will be appreciated that since the retractable driveshaft 124 extends at least partially into the wing body 105 of the wing assembly 104 when the retractable driveshaft 124 is engaged with the mid-wing gearbox 130, the retractable driveshaft 124 is configured to accommodate the misalignment of the retractable driveshaft 124 and the stow axis 142 by selectively disengaging from the mid-wing gearbox 130. Accordingly, it will be appreciated that the gearbox 122 comprising the retractable driveshaft 124, the mid-wing gearbox 130, and the wing assembly rotation system 140 may be referred to collectively as a stow system 150.

Figure 2:
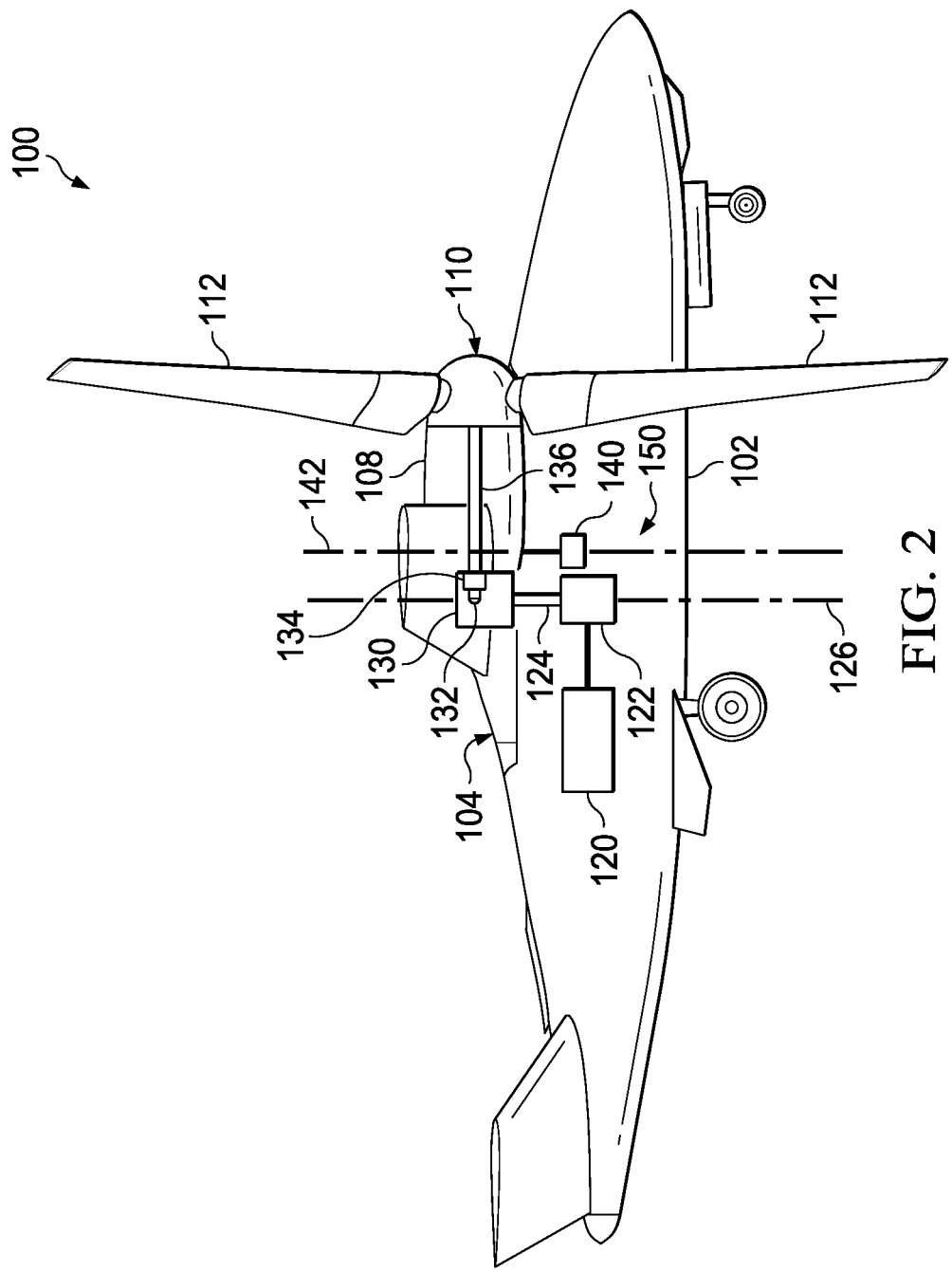
FIG. 2 is a side view of the aircraft of FIG. 1.

Referring now to FIG. 2, a side view of the aircraft 100 of FIG. 1 is shown according to this disclosure. Aircraft 100 is shown with the retractable driveshaft 124 engaged with the mid-wing gearbox 130 and wing assembly 104 configured in a flight position. As shown, the retractable driveshaft 124 is selectively extended vertically to engage the mid-wing gearbox 130 when the wing assembly 104 is configured in the flight position. Thus, when the retractable driveshaft 124 is engaged with the mid-wing gearbox 130, rotational motion of the retractable driveshaft 124 imparted by the internal combustion engine 120 is transferred through the mid-wing gearbox 130 to the interconnect driveshafts 132 and the rotor masts to impart rotation to the counter-rotating rotor assemblies 110 to selectively propel the aircraft 100.

Figure 3:
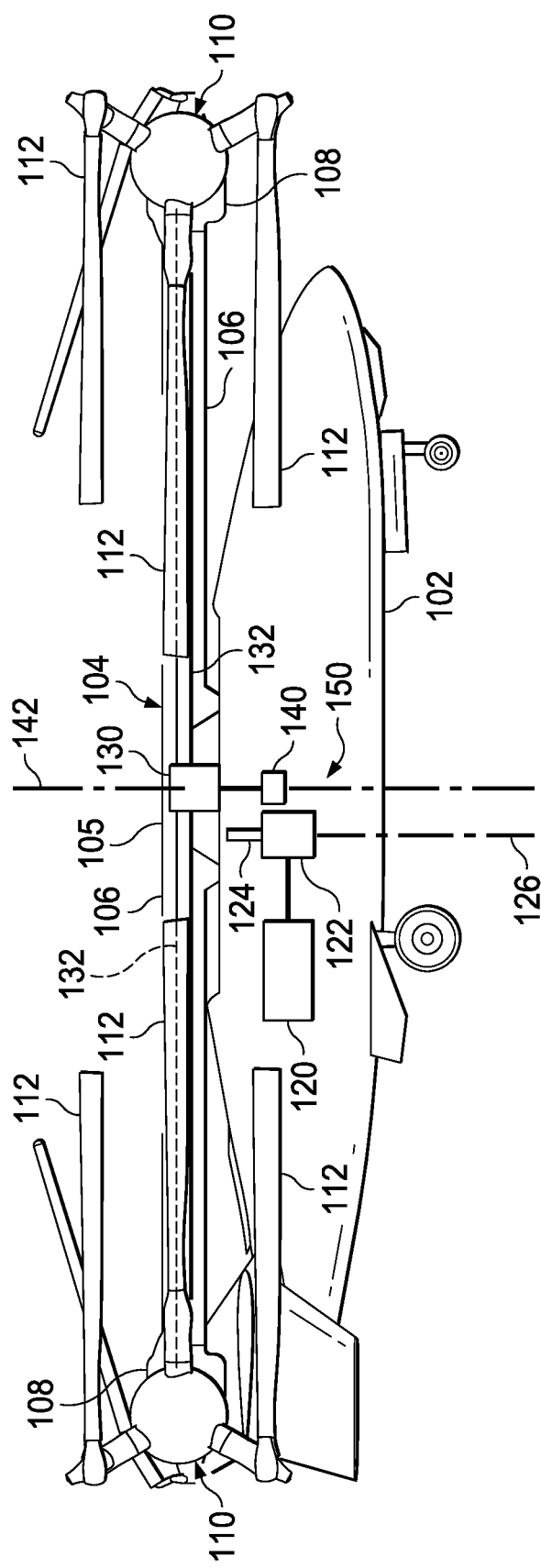
FIG. 3 is a side view of the aircraft of FIGS. 1 and 2.

Referring now to FIG. 3, a side view of the aircraft 100 of FIGS. 1 and 2 is shown according to this disclosure. Aircraft 100 is shown with the retractable driveshaft 124 disengaged with the mid-wing gearbox 130 and wing assembly 104 configured in a stowed position. As shown, the retractable driveshaft 124 is selectively retracted vertically to disengage the mid-wing gearbox 130. After the retractable driveshaft 124 is disengaged from the mid-wing gearbox 130, the wing assembly 104 may be selectively rotated relative to the fuselage 102 about the stow axis 142 in a clockwise direction as viewed from the top of the aircraft 100 until the wing assembly 104 reaches the stowed position. In the stowed position, it will be appreciated that the retractable driveshaft 124 is misaligned from the mid-wing gearbox 130. In some embodiments, the stowed configuration of the wing assembly 104 may be reached after the wing assembly 104 is rotated about ninety degrees. Furthermore, in some embodiments, it will be appreciated that the wing assembly 104 may be rotated relative to the fuselage 102 about the stow axis 142 in a counter-clockwise direction.

Figure 4A:
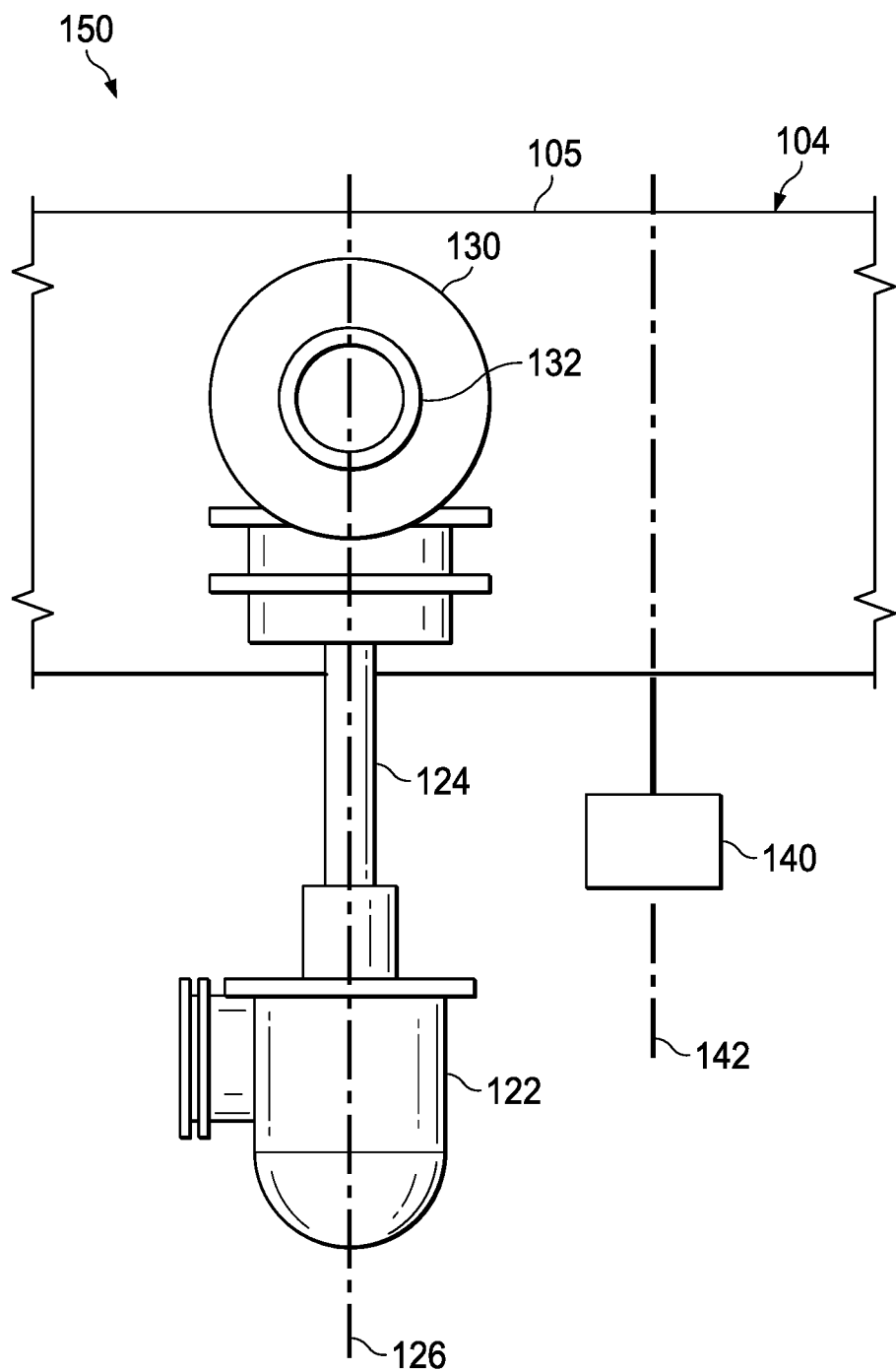
FIG. 4A is a detailed side view of the stow system of the aircraft of FIGS. 1-3 in a first configuration according to this disclosure.
Figure 4B:
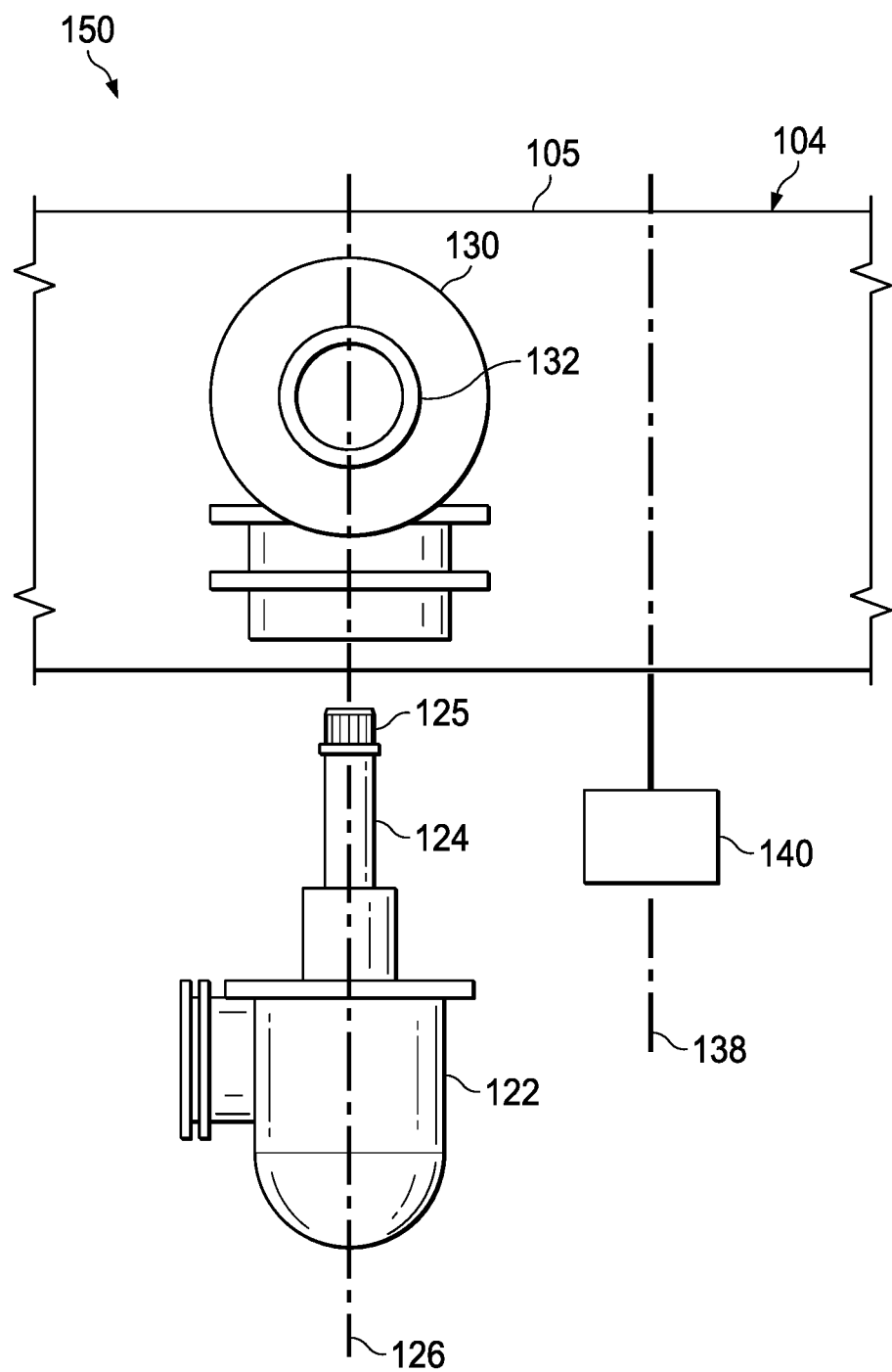
FIG. 4B is a detailed side view of the stow system of the aircraft of FIGS. 1-3 in a second configuration according to this disclosure.
Figure 4C:
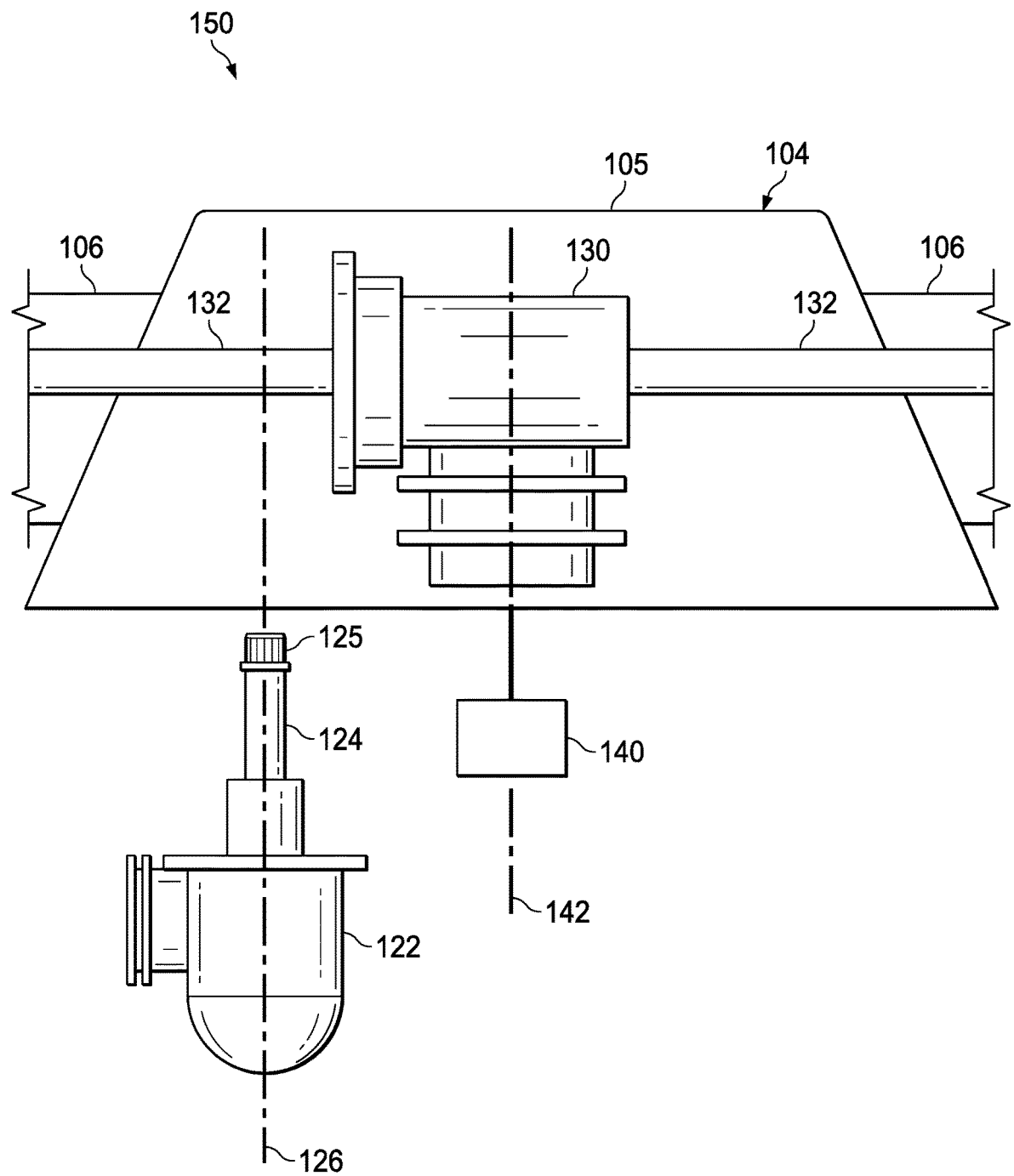
FIG. 4C is a detailed side view of the stow system of the aircraft of FIGS. 1-3 in a third configuration according to this disclosure.

Referring now to FIGS. 4A-4C, detailed side views of the stow system 150 of the aircraft 100 of FIGS. 1-3 are shown according to this disclosure. More specifically, FIG. 4A shows the retractable driveshaft 124 engaged with the mid-wing gearbox 130 and the wing assembly 104 configured in the flight position, FIG. 4B shows the retractable driveshaft 124 disengaged from the mid-wing gearbox 130 and wing assembly 104 configured in the flight position, and FIG. 4C shows the retractable driveshaft 124 disengaged from the mid-wing gearbox 130 and the wing assembly 104 rotated about the stow axis 142 and configured in the stowed position. It will be appreciated that the retractable driveshaft 124 and the mid-wing gearbox 130 comprise an interface designed to properly align splines 125 of the retractable driveshaft 124 and the mid-wing gearbox 130 when the retractable driveshaft 124 is being selectively extended to engage the mid-wing gearbox 130.

In operation, the retractable driveshaft 124 is selectively extended and retracted to engage and disengage from, respectively, the mid-wing gearbox 130 disposed in the wing body 105 of the wing assembly 104. The retractable driveshaft 124 may be actuated electrically, electro-mechanically, hydraulically, and/or mechanically. For example, in some embodiments, the retractable driveshaft 124 may be extended and retracted by a rack and pinion. However, in other embodiments, the retractable driveshaft 124 may be extended and retracted by a machine screw type system. When the retractable driveshaft 124 is engaged with the mid-wing gearbox 130 as shown in FIG. 4A, the retractable driveshaft 124 may be selectively retracted to a retracted position as shown in FIG. 4B. After the retractable driveshaft 124 is retracted, the wing assembly 104 may be selectively rotated relative to the fuselage 102 about the stow axis 142 until the wing assembly 104 reaches the stowed position as shown in FIG. 4C. Once the stow system 150 of aircraft 100 is configured as shown in FIGS. 3 and 4C, the aircraft 100 may be parked, stowed, and/or driven into an entrance of a hangar while reducing the overall footprint of the aircraft 100, thereby allowing for more compact storage of aircraft 100 and increased storage capacity of multiple aircrafts 100. Furthermore, from the stowed position shown in FIG. 4C, the wing assembly 104 may be selectively rotated relative to the fuselage 102 about the stow axis 142 until the wing assembly 104 reaches the flight position as shown in FIG. 4B. Thereafter, the retractable driveshaft 124 may be selectively extended to engage the mid-wing gearbox 130 as shown in FIGS. 2 and 4A, where the aircraft 100 is configured for flight.

Figure 5:
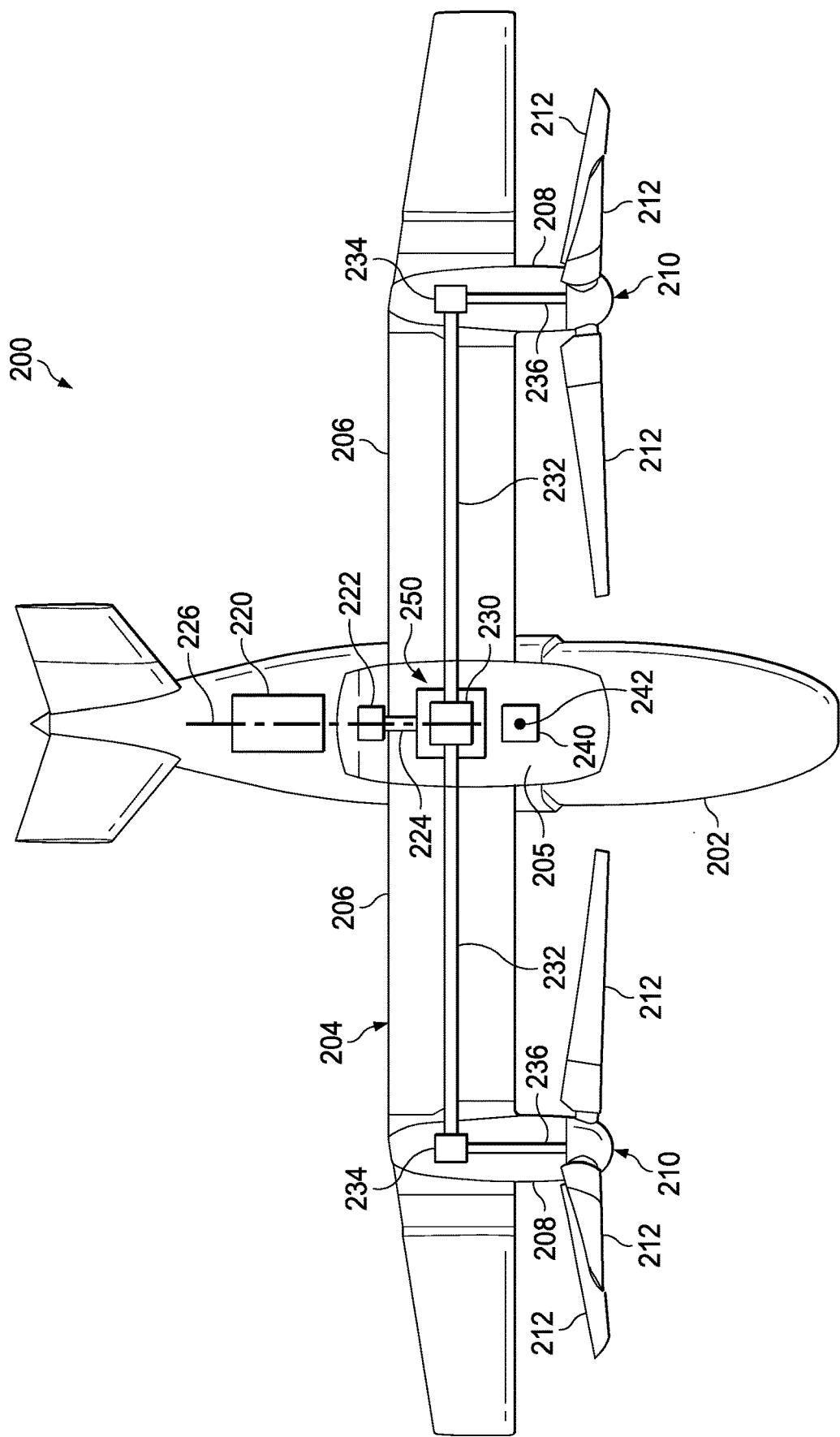
FIG. 5 is a top view of another embodiment of an aircraft according to this disclosure.

Referring now to FIG. 5, a top view of another embodiment of an aircraft 200 is shown according to this disclosure. Aircraft 200 is substantially similar to aircraft 100. Aircraft 200 comprises a fuselage 202, a stowable wing assembly 204 comprising a selectively rotatable wing body 205 and a plurality of wings 206 extending therefrom, and a plurality of pylons 208 comprising a rotor assembly 210 and a plurality of rotor blades 212 coupled thereto. Aircraft 200 also comprises an internal combustion engine 220 coupled to a gearbox 222 comprising a retractable driveshaft 224 (rotatable about rotation axis 226) configured to engage a mid-wing gearbox 230 disposed within the selectively rotatable wing body 205 of the wing assembly 204. Further, aircraft 200 comprises an interconnect driveshaft 232 extending from the mid-wing gearbox 230 through each wing 206 to a pylon gearbox 234 disposed in each pylon 208, and a rotor mast 236 coupling each rotor assembly 210 to an associated pylon gearbox 234. Still further, aircraft 200 may comprise a wing assembly rotation system 240 configured to selectively rotate the wing assembly 204 with respect to the fuselage 202 about stow axis 242. It will be appreciated that the gearbox 222 comprising the retractable driveshaft 224, the mid-wing gearbox 230, and the wing assembly rotation system 240 may be referred to collectively as a stow system 250. However, as opposed to the vertically extended and retracted retractable driveshaft 124 of aircraft 100, retractable driveshaft 224 of aircraft 200 is longitudinally extended and retracted in forward and backward directions, respectively, with respect to a length of the fuselage 202 of aircraft 200.

Figure 6:
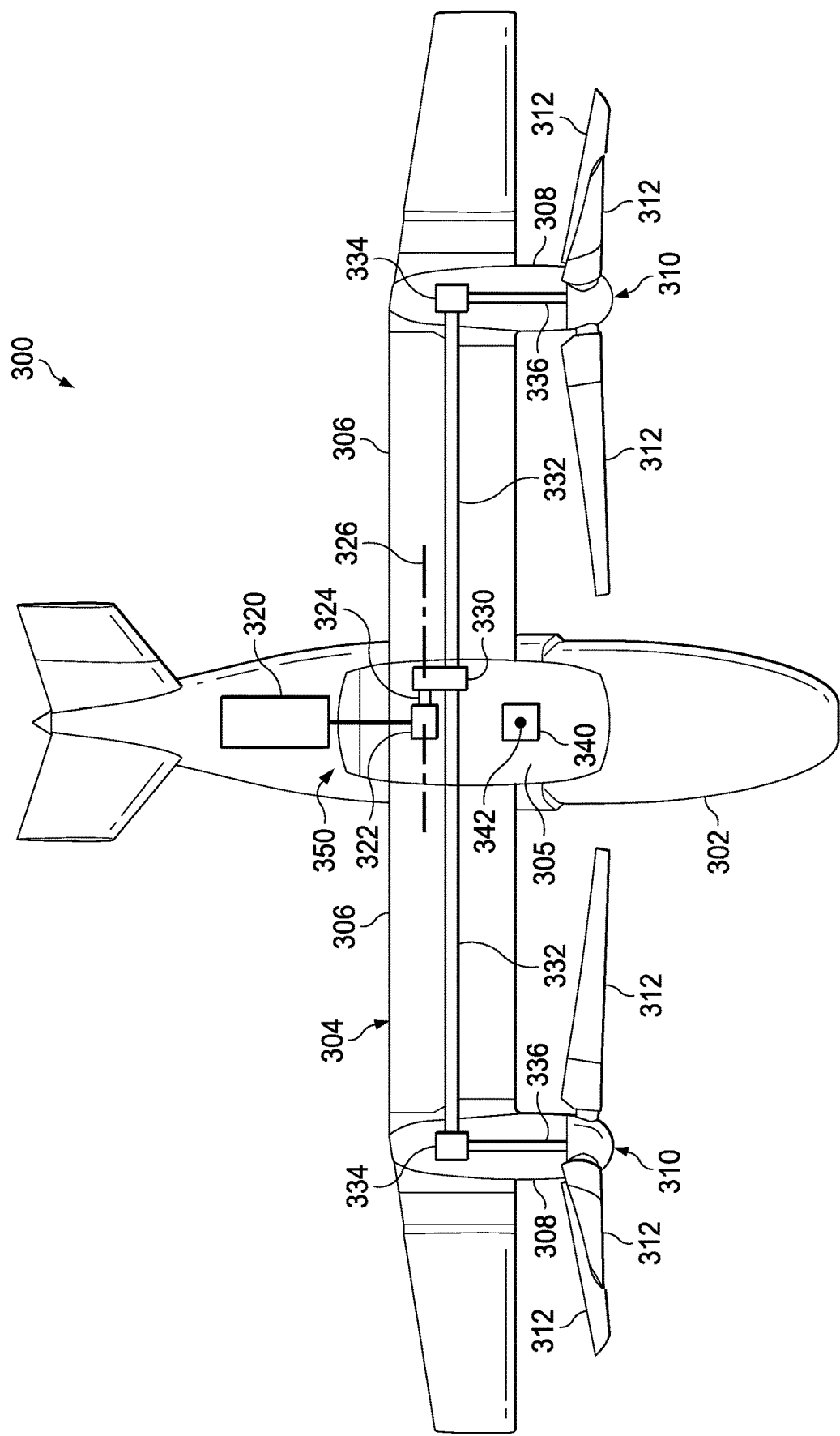
FIG. 6 is a top view of yet another embodiment of an aircraft according to this disclosure.

Referring now to FIG. 6, a top view of yet another embodiment of an aircraft 300 is shown according to this disclosure. Aircraft 300 is substantially similar to aircraft 200. Aircraft 300 comprises a fuselage 302, a stowable wing assembly 304 comprising a selectively rotatable wing body 305 and a plurality of wings 306 extending therefrom, and a plurality of pylons 308 comprising a rotor assembly 310 and a plurality of rotor blades 312 coupled thereto. Aircraft 300 also comprises an internal combustion engine 320 coupled to a gearbox 322 comprising a retractable driveshaft 324 (rotatable about rotation axis 326) configured to engage a mid-wing gearbox 330 disposed within the selectively rotatable wing body 305 of the wing assembly 304. Further, aircraft 300 comprises an interconnect driveshaft 332 extending from the mid-wing gearbox 330 through each wing 306 to a pylon gearbox 334 disposed in each pylon 308, and a rotor mast 336 coupling each rotor assembly 310 to an associated pylon gearbox 334. Still further, aircraft 300 may comprise a wing assembly rotation system 340 configured to selectively rotate the wing assembly 304 with respect to the fuselage 302 about stow axis 342. It will be appreciated that the gearbox 322 comprising the retractable driveshaft 324, the mid-wing gearbox 330, and the wing assembly rotation system 340 may be referred to collectively as a stow system 350. However, as opposed to the longitudinally extended and retracted retractable driveshaft 224 of aircraft 200 with respect to the length of the fuselage 202 of aircraft 200, retractable driveshaft 324 of aircraft 300 is laterally extended and retracted, with respect to a width of the fuselage 202 and/or length of a wing 306 of aircraft 300.

Figure 7:
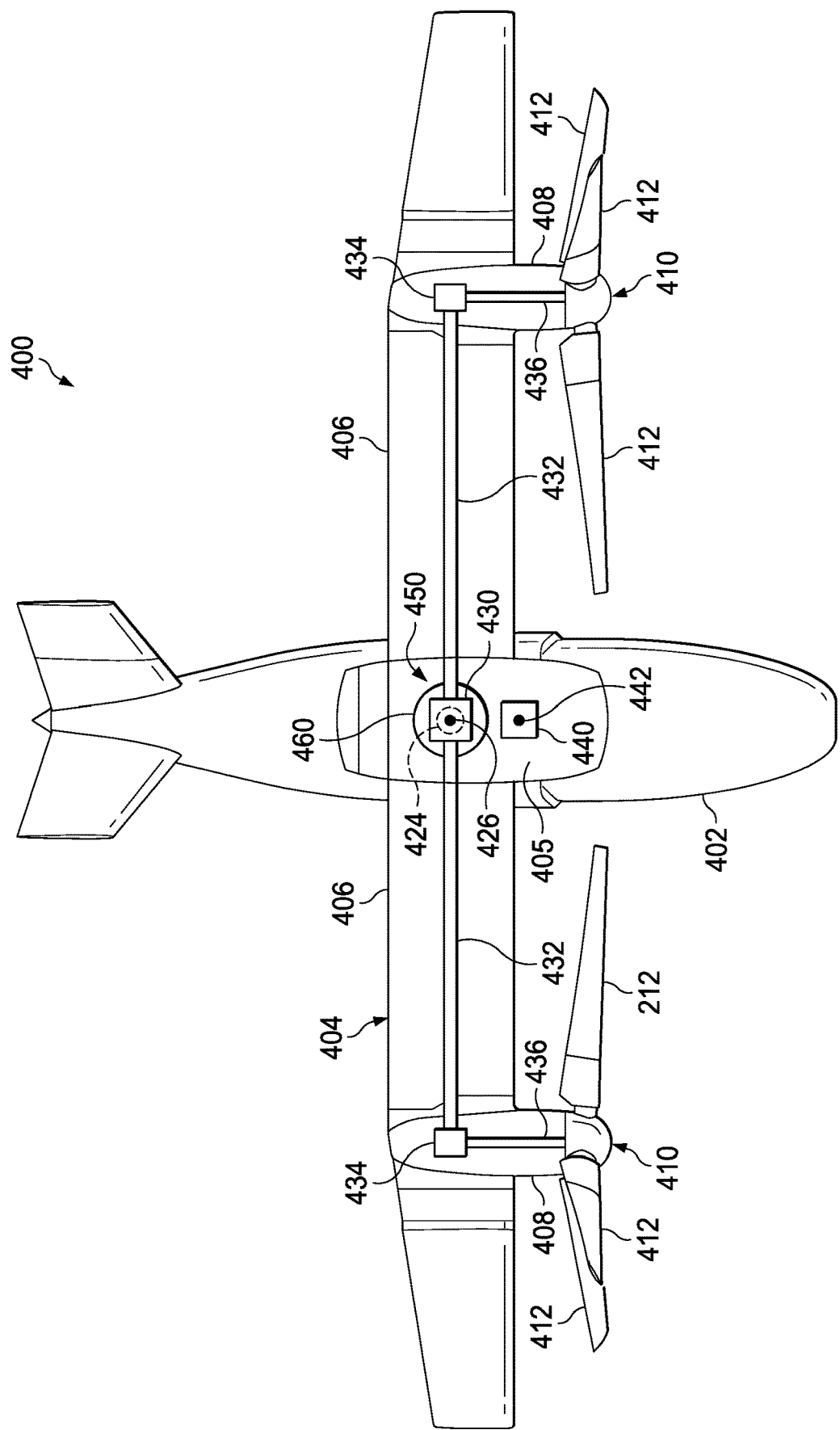
FIG. 7 is a top view of an alternative embodiment of an aircraft according to this disclosure.
Figure 8:
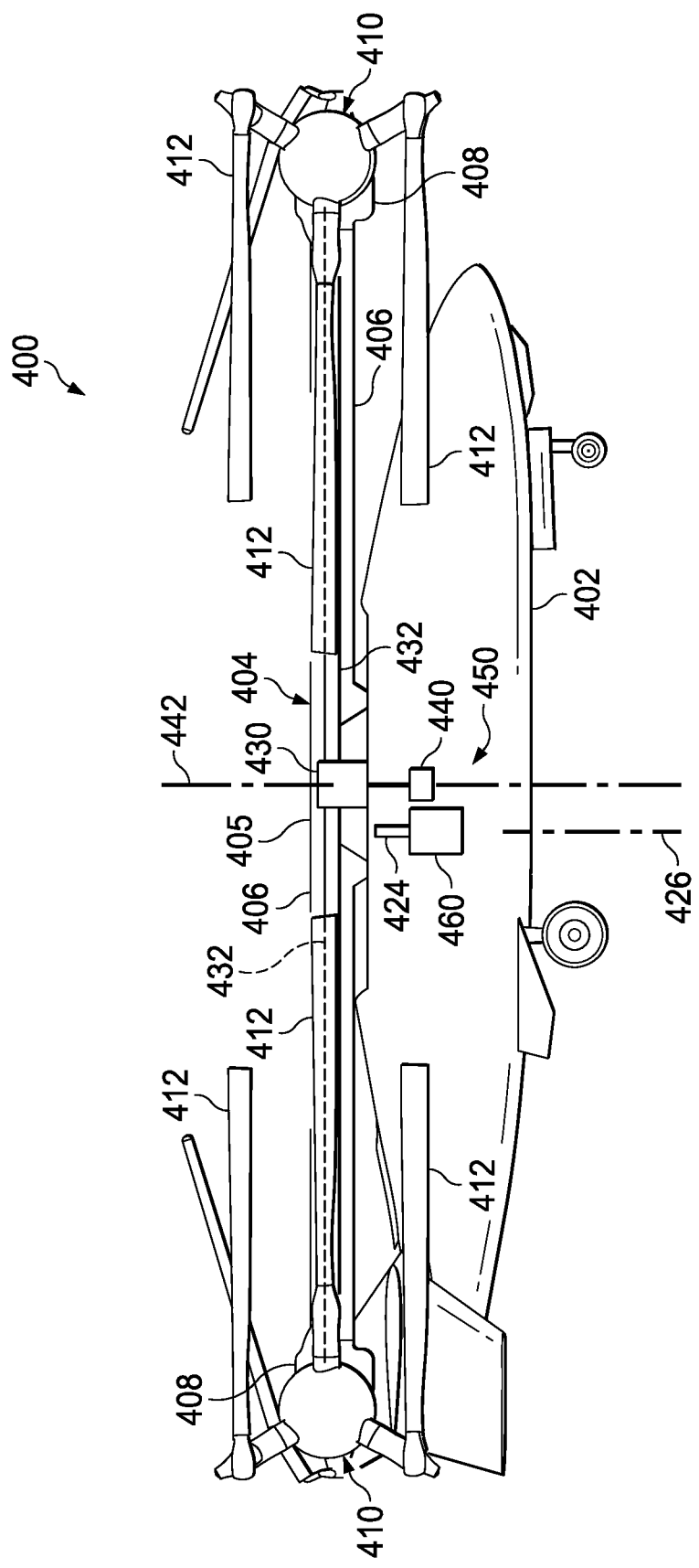
FIG. 8 is a side view of the aircraft of FIG. 7.

Referring now to FIGS. 7 and 8, a top view and a side view of an alternative embodiment of an aircraft 400 is shown according to this disclosure. Aircraft 400 may be substantially similar to aircraft 100, 200, 300. Aircraft 400 comprises a fuselage 402, a stowable wing assembly 404 comprising a selectively rotatable wing body 405 and a plurality of wings 406 extending therefrom, and a plurality of pylons 408 comprising a rotor assembly 410 and a plurality of rotor blades 412 coupled thereto. However, as opposed to the internal combustion engine 120, 220, 320 coupled to gearbox 122, 222, 322 comprising the retractable driveshaft 124, 224, 324, aircraft 400 comprises an electrical motor 460 comprising a retractable driveshaft 424 configured to engage a mid-wing gearbox 430 disposed within the selectively rotatable wing body 405 of the wing assembly 404 in a substantially similar manner to aircraft 100, 200, 300. The electrical motor 460 is capable of imparting rotation to the retractable driveshaft 424 about rotation axis 426 while also selectively extending (FIG. 7) and retracting (FIG. 8) the retractable driveshaft 424 along rotation axis 426 to engage and disengage the mid-wing gearbox 430.

Further, aircraft 400 also comprises an interconnect driveshaft 432 extending from the mid-wing gearbox 430 through each wing 406 to a pylon gearbox 434 disposed in each pylon 408, and a rotor mast 436 coupling each rotor assembly 410 to an associated pylon gearbox 434. Still further, aircraft 400 may comprise a wing assembly rotation system 440 configured to selectively rotate the wing assembly 404 with respect to the fuselage 402 about stow axis 442. It will be appreciated that the electrical motor 460, the mid-wing gearbox 430, and the wing assembly rotation system 440 may be referred to collectively as a stow system 450. Furthermore, while the retractable driveshaft 424 of the electrical motor 460 is shown as being vertically extendable and retractable similarly to retractable driveshaft 124 of aircraft 100, in some embodiments, retractable driveshaft 424 may also be configured to be longitudinally extended and retracted similarly to retractable driveshaft 224 of aircraft 200, and in other embodiments, laterally extended and retracted similarly to retractable driveshaft 324 of aircraft 300.

It will be appreciated that any of the retractable driveshafts 124, 224, 324, 424 may be extended and retracted in any direction depending on the configuration of the aircraft 100, 200, 300, 400. Additionally, while the stow systems 150, 250, 350, 450 are disclosed with reference to an aircraft 100, 200, 300, 400 it will further be appreciated that stow systems 150, 250, 350, 450 may be used in other vehicles and/or pieces of machinery that require a selectively retractable driveshaft 124, 224, 324, 424 that may be selectively extended and retracted to engage a gearbox disposed in a movable component of the vehicle and/or piece of machinery, such that when the selectively retractable driveshaft 124, 224, 324, 424 is disengaged from the gearbox, the movable component of the vehicle and/or other piece of machinery may be selectively rotated to reduce the overall footprint of the vehicle and/or piece of machinery in order, thereby allowing for more compact storage of the vehicle and/or piece of machinery.

Figure 9:
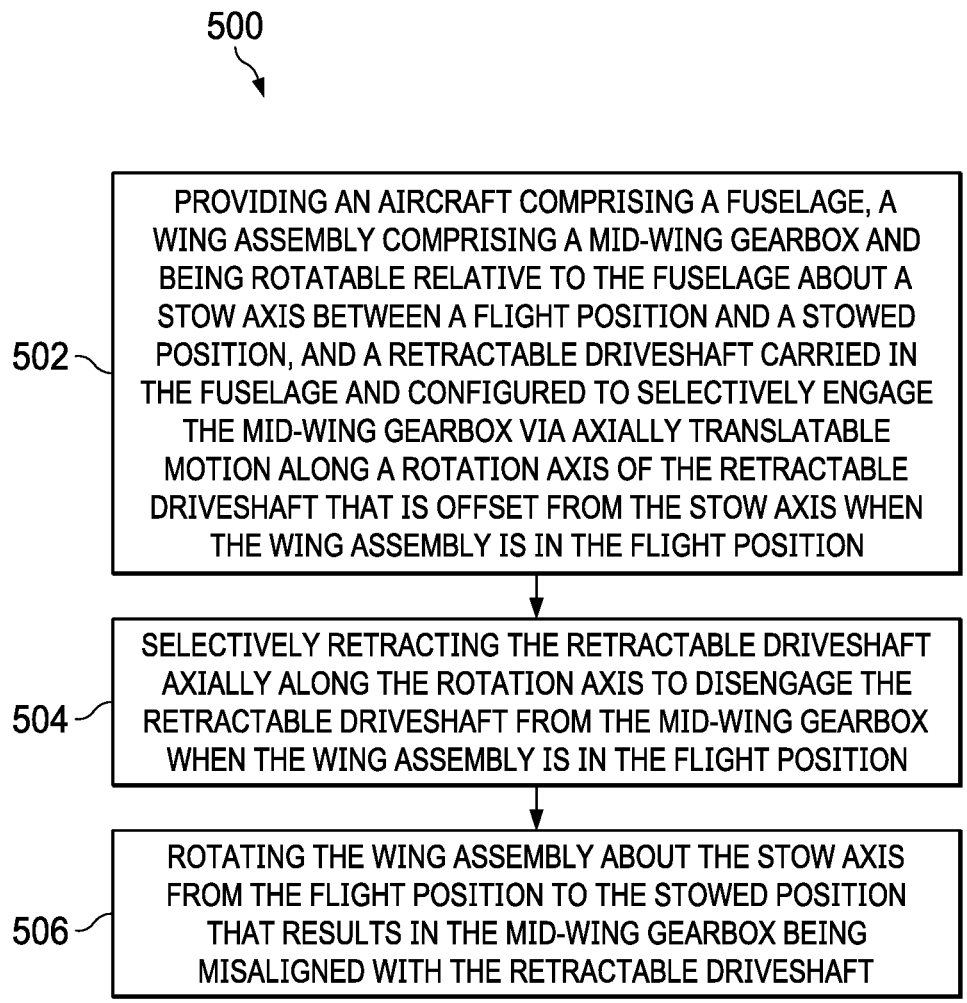
FIG. 9 is a flowchart of a method of operating an aircraft according to this disclosure.

Referring now to FIG. 9, a flowchart of a method 500 of operating an aircraft 100, 200, 300 is shown according to this disclosure. The method 500 may begin at block 502 by providing an aircraft 100, 200, 300, 400 comprising a fuselage 102, 202, 302, 402, a wing assembly 104, 204, 304, 404 comprising a mid-wing gearbox 130, 230, 330, 430 and being rotatable relative to the fuselage 102, 202, 302, 402 about a stow axis 142, 242, 342, 442 between a flight position and a stowed position, and a retractable driveshaft 124, 224, 324, 424 configured to selectively engage the mid-wing gearbox 130, 230, 330, 430 via axially translatable motion along a rotation axis 126, 226, 326, 426 of the retractable driveshaft 124, 224, 324, 424 that is offset from the stow axis 142, 242, 342, 442 when the wing assembly 104, 204, 304, 404 is in the flight position. The method 500 may continue at block 504 by selectively retracting the retractable driveshaft axially along the rotation axis to disengage the retractable driveshaft from the mid-wing gearbox when the wing assembly is in the flight position. The method 500 may conclude at block 506 by rotating the wing assembly about the stow axis from the flight position to the stowed position that results in the mid-wing gearbox being misaligned with the retractable driveshaft. Additionally, method 500 may further comprise rotating the wing assembly about the stow axis from the stowed position to the flight position to align the mid-wing gearbox with the retractable driveshaft, and selectively actuating the retractable driveshaft axially along the rotation axis to engage the retractable driveshaft with the mid-wing gearbox when the wing assembly is in the flight position.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a fuselage;
   a wing assembly comprising a mid-wing gearbox, the wing assembly being rotatable relative to the fuselage about a stow axis; and
   a retractable driveshaft configured to selectively engage the mid-wing gearbox via axially translatable motion along a rotation axis of the retractable driveshaft that is offset from the stow axis.

2. The aircraft of claim 1, wherein the stow axis is located forward of the rotation axis.

3. The aircraft of claim 1, wherein the wing assembly is rotatable about the stow axis between a flight position and a stowed position.

4. The aircraft of claim 3, wherein the mid-wing gearbox is aligned with the retractable driveshaft along the rotation axis when the wing assembly is in the flight position, such that the retractable driveshaft can selectively engage the mid-wing gearbox when the wing assembly is in the flight position.

5. The aircraft of claim 4, wherein the retractable driveshaft is selectively actuated vertically with respect to the fuselage to engage and disengage the mid-wing gearbox when the wing assembly is in the flight position.

6. The aircraft of claim 4, wherein the retractable driveshaft is selectively actuated horizontally with respect to the fuselage to engage and disengage the mid-wing gearbox when the wing assembly is in the flight position.

7. The aircraft of claim 4, wherein when the retractable driveshaft is engaged with the mid-wing gearbox, rotational motion of the retractable driveshaft imparted by at least one of an internal combustion engine and an electrical motor is transferred through interconnect driveshafts coupled to the mid-wing gearbox in order to impart rotation to a plurality of rotor assemblies disposed on the wing assembly.

8. The aircraft of claim 3, wherein the retractable driveshaft is selectively retracted vertically to disengage the mid-wing gearbox in the flight position to allow selective rotation of the wing assembly about the stow axis from the flight position to the stowed position.

9. The aircraft of claim 8, wherein the mid-wing gearbox is misaligned with the retractable driveshaft when the wing assembly is in the stowed position.

10. The aircraft of claim 1, wherein the aircraft comprises a vertical takeoff and landing (VTOL) aircraft configured for operation in each of an airplane mode and a helicopter mode.

11. A method of operating an aircraft, comprising:
    providing an aircraft with a fuselage, a wing assembly comprising a mid-wing gearbox and being rotatable relative to the fuselage about a stow axis between a flight position and a stowed position, and a retractable driveshaft configured to selectively engage the mid-wing gearbox via axially translatable motion along a rotation axis of the retractable driveshaft that is offset from the stow axis when the wing assembly is in the flight position;
    selectively retracting the retractable driveshaft axially along the rotation axis to disengage the retractable driveshaft from the mid-wing gearbox when the wing assembly is in the flight position; and
    rotating the wing assembly about the stow axis from the flight position to the stowed position that results in the mid-wing gearbox being misaligned with the retractable driveshaft.

12. The method of claim 11, further comprising: operating a drive component without engaging rotor assemblies of the aircraft.

13. The method of claim 11, further comprising: rotating the wing assembly about the stow axis from the stowed position to the flight position to align the mid-wing gearbox with the retractable driveshaft.

14. The method of claim 13, further comprising: selectively actuating the retractable driveshaft axially along the rotation axis to engage the retractable driveshaft with the mid-wing gearbox when the wing assembly is in the flight position.

* * * * *